United States Patent
Hahn et al.

(10) Patent No.: US 11,505,352 B2
(45) Date of Patent: Nov. 22, 2022

(54) DEVICE AND METHOD FOR PROCESSING CONTAINERS BY MEANS OF A DRIVERLESS TRANSPORT SYSTEM

(71) Applicant: KRONES AG, Neutraubling (DE)

(72) Inventors: Wolfgang Hahn, Neutraubling (DE); Thomas Mildner, Kümmersbruck (DE); Stefan Raith, Pfatter (DE); Markus Zoelfl, Metten/Berg (DE)

(73) Assignee: KRONES AG, Neutraubling (DE)

( * ) Notice: Subject to any disclaimer, the term of this patent is extended or adjusted under 35 U.S.C. 154(b) by 82 days.

(21) Appl. No.: 16/768,901

(22) PCT Filed: Dec. 6, 2018

(86) PCT No.: PCT/EP2018/083746
§ 371 (c)(1),
(2) Date: Jun. 2, 2020

(87) PCT Pub. No.: WO2019/115331
PCT Pub. Date: Jun. 20, 2019

(65) Prior Publication Data
US 2021/0163167 A1    Jun. 3, 2021

(30) Foreign Application Priority Data

Dec. 13, 2017    (DE) ................... 10 2017 129 847.9

(51) Int. Cl.
*B65B 59/04*    (2006.01)
*B67C 7/00*    (2006.01)
(Continued)

(52) U.S. Cl.
CPC .............. *B65B 59/04* (2013.01); *B29C 49/48* (2013.01); *B65B 3/022* (2013.01); *B65C 9/0062* (2013.01);
(Continued)

(58) Field of Classification Search
CPC ......... B67C 7/00; B67C 7/002; B67C 7/0073; B67C 2003/221; B67C 2003/227;
(Continued)

(56) References Cited

U.S. PATENT DOCUMENTS 5,394,975 A * 3/1995 Bernhard ................ B67C 7/002
198/473.1
6,666,803 B1 * 12/2003 Spatafora ................ B65B 59/04
483/16

(Continued)

FOREIGN PATENT DOCUMENTS

| DE | 10 2009 044 163 A1 | 4/2011 | |
|---|---|---|---|
| DE | 10 2015 119 320 A1 | 5/2017 | |
| DE | 10 2016 205 255 A1 | 10/2017 | |
| DE | 202016102752 U1 * | 10/2017 | ............ B25J 9/0084 |
| JP | H07100833 A | 4/1995 | |

OTHER PUBLICATIONS

International Search Report dated Mar. 6, 2019 for PCT/EP2018/083746.

*Primary Examiner* — Stephen F. Gerrity
(74) *Attorney, Agent, or Firm* — Schmeiser, Olsen & Watts, LLP

(57) ABSTRACT

Provided is a device for processing containers, in particular plastic containers, including at least one container-processing apparatus, which has at least one changeover access entry, at which at least one of format parts and tools can be exchanged during changeover operation, and including a transport system, by means of which the at least one of format parts and tools can be brought to the at least one container-processing apparatus. The transport system is a driverless transport system, by which the format parts and/or tools can be automatically brought to at least one container-processing apparatus.

17 Claims, 2 Drawing Sheets

Figure 1:
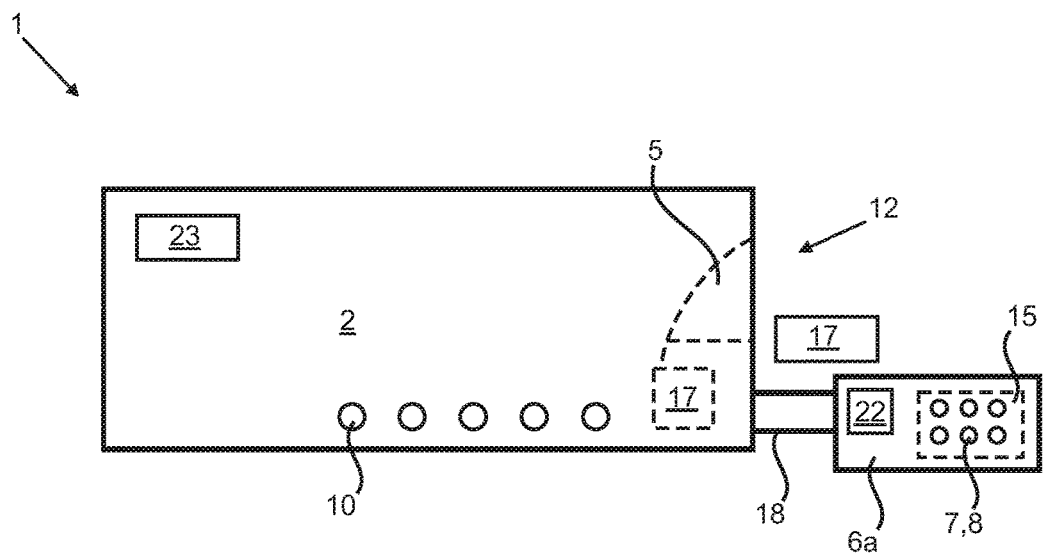

(51) Int. Cl.
*B65B 3/02* (2006.01)
*B67C 3/22* (2006.01)
*B29C 49/48* (2006.01)
*B65C 9/00* (2006.01)
*B29L 31/00* (2006.01)

(52) U.S. Cl.
CPC .... *B67C 7/0073* (2013.01); *B29C 2049/4858* (2013.01); *B29L 2031/712* (2013.01); *B67C 2003/221* (2013.01); *B67C 2003/227* (2013.01)

(58) Field of Classification Search
CPC ....... B65B 3/022; B65B 59/04; B29C 31/006; B29C 2049/4858; B65C 9/0062
See application file for complete search history.

(56) References Cited

U.S. PATENT DOCUMENTS

| | | |
|---|---|---|
| 2009/0202335 A1 | 8/2009 | Trebbi et al. |
| 2011/0078979 A1 | 4/2011 | Hutter |
| 2013/0224323 A1 | 8/2013 | Meinzinger et al. |
| 2014/0305076 A1* | 10/2014 | Winzinger ............ B65B 59/04 53/201 |
| 2015/0145178 A1* | 5/2015 | Blochmann ............ B29C 49/48 264/523 |
| 2015/0251366 A1 | 9/2015 | Voth et al. |
| 2017/0182679 A1 | 6/2017 | Winzinger |
| 2019/0248528 A1* | 8/2019 | Gigante et al. ......... B65B 59/04 |

* cited by examiner

DEVICE AND METHOD FOR PROCESSING CONTAINERS BY MEANS OF A DRIVERLESS TRANSPORT SYSTEM

CROSS-REFERENCE TO RELATED APPLICATIONS

This application claims priority to PCT Application No. PCT/EP2018/083746, having a filing date of Dec. 6, 2018, based on German Application No. 10 2017 129 847.9, having a filing date of Dec. 13, 2017, the entire contents both of which are hereby incorporated by reference.

FIELD OF TECHNOLOGY

The following relates to a device and a method for processing containers, in particular plastic containers. Such container-processing apparatus for the production and/or processing of plastic containers have long been known from the conventional art. A container-processing apparatus can usually treat a large number of different container types. For this purpose, the container-processing apparatus comprises a series of interchangeable format parts and/or tools in order to treat or produce the respective container type, which must be exchanged accordingly as soon as another container is to be produced.

BACKGROUND

The format parts and tools required for the new container must be provided at the container-processing apparatus for setting up container-processing machines or for changing over to another container type. This is usually done on pallets, chassis, format parts trolleys or similar apparatus that are stored in interim storage facilities until use and are transported to the changeover location by forklift wagons or lifting wagons. This is usually done manually by the plant operator or the plant staff.

The provision of the new format parts and tools therefore requires the deployment of personnel. In addition, the provision is usually carried out during the changeover process or in a changeover operation of the machine, i.e. when the machine is at a standstill, which means that the changeover process is unnecessarily lengthened, as the operator must first fetch the new format parts from the warehouse, then carry out the changeover and then return the replaced format parts to the storage. In order to keep this machine downtime to a minimum, the operator often provides the parts during production, which means that the operator has to leave the operating location or the running machine. If a malfunction or similar occurs on the machine during this period, it is not possible to react in time, resulting in an increased loss of production. If the provision of the new format parts and tools were to be carried out by other personnel, additional personnel and organisational effort would be required.

SUMMARY

An aspect relates to a device and a method, with which the format parts and/or tools can be provided particularly effectively and with which the changeover times for the plants can be considerably reduced.

Embodiments of the present invention is directed to a device for processing containers, in particular plastic containers, comprising at least one container-processing apparatus, which has at least one changeover access entry, at which format parts and/or tools can be exchanged during changeover operation, and comprising a transport system, by means of which the format parts and/or tools can be brought to the at least one container-processing apparatus.

According to embodiments of the invention, the transport system is a driverless transport system, by means of which the format parts and/or tools can be automatically brought to at least one container-processing apparatus. Automatic means that the transport system automatically brings the new format parts and/or tools to the container-processing apparatus without the intervention of an operator. For this purpose, a control device is assigned to the transport system. In this context, it would also be conceivable that a plant operator can pass on a command to the transport system via an operating terminal on the container-processing apparatus or via a portable operating terminal, when new format parts are required and also which format parts are required.

It is therefore proposed according to embodiments of the invention that when the container-processing apparatus is converted to a new container type, the format parts required for this are provided by means of an autonomously movable transport system. The format parts can be exchanged manually by the system operator or automatically by a robot or the transport system itself. In particular, the driverless transport system achieves that the format parts and/or tools are already at the container-processing apparatus before the changeover begins, which means that without additional personnel particularly effective retrofitting is possible with little downtime of the system.

The device according to embodiments of the invention and also the method according to embodiments of the invention therefore have the particular advantages that the automatic provision of the format parts to the container-processing apparatus by the driverless transport system can significantly shorten the changeover times and also reduce operator stress, which means that higher availability and lower overall operating costs can be achieved. Depending on the type or number of format parts and tools, these can under certain circumstances also be transferred to the driverless transport system, hereinafter also called DTS, without separate carrying means, which can also result in cost savings. In addition, an already existing DTS can also be used with little additional effort, which means that personnel costs can be saved.

The format parts are therefore provided directly to the container-processing apparatus during production such in time that the format parts are already ready to use at the machine at the start of the changeover process. Under certain circumstances, the changeover can already be started during operation, which can significantly reduce the downtime of the system. For example, a test run can be carried out to check the format parts for assignment and completeness.

In an preferred embodiment, the container-processing apparatus is selected from a group of processing apparatus, which includes a heating device for heating the containers, a shaping device for shaping the containers, a labelling device for the labelling the containers, a filling device for filling the containers, a closing device for closing the containers, a packaging device for packing the containers, a transport device for transporting the containers, a sterilization device for sterilising the containers or the like.

The format parts and/or tools that have to be exchanged when changing to another container type are blow molds, holding devices, transport mandrels, filling heads, filling nozzles, blowing nozzles, sterilization nozzles, packaging materials, closures, stretching rods, Guide rails, holding mandrels, holding clips and the like.

In an p embodiment, the format parts and/or tools are transferable by means of the driverless transport system to a predetermined working position of the container-processing apparatus, wherein this working position is the changeover access entry. The changeover access entry is an opening or a lock in a wall of the container-processing apparatus through which an exchange or a change of the format parts can be carried out. The driverless transport system particularly has a location registration device in order to locate the working position or the changeover access entry. For this purpose, for example, a transmission device can also be arranged at the corresponding position on the container-processing apparatus, which communicates with the location detection device of the DTS. In addition, the travel path can also be predetermined for the DTS via the control device and/or the DTS has an optical detection system in order to recognize the work position and to approach it accordingly.

Furthermore, the transport system has a drive apparatus, which is a battery, a rechargeable battery or an electric or pneumatic drive.

In a further embodiment, the format parts and/or tools are arranged on a carrying frame which can be received and/or taken off by the driverless transport system. The format parts and/or tools are accordingly arranged on carrying frames for the changeover that can be picked up directly by the DTS. These carrying frames can, for example, be pallet-like frames or the like. Accordingly, the DTS is a self-propelled lifting wagon. The DTS is advantageously designed at least like a lifting wagon. However, all other possible configurations of the carrying frame are also conceivable, such as frames with rollers.

The format parts and tools are arranged within easy reach on the carrying frame, such as a perforated plate or the like, so that no time is needed to search for the parts. This arrangement on the carrying frame can be done manually by an operator or by the driverless transport system itself, wherein the same has at least one robot arm with a gripping device for gripping the format parts for this purpose. As described into more detail in the figures, the carrying frames can also advantageously have lifting devices or support rollers, so that the carrying frame can be positioned closer to the changeover location of the machine. The lifting devices or support rollers also make it easier for the DTS to pick up and deliver them, and the DTS can also have corresponding lifting devices or support rollers for this purpose.

In a further embodiment, the device has a variety of container-processing apparatus and by means of the driverless transport system the format parts and/or tools are bringable to the variety of container-processing apparatus. The driverless transport system is accordingly freely movable between a plurality of container-processing apparatus or movable on a rail system. The rail system runs between the individual container-processing apparatus, and the path of the transport system can be predetermined via the control device. Correspondingly, the free travel path to the DTS can also be specified via the control device. The travel path can also be adapted and changed manually, so that it is possible to react quickly to changing circumstances. The DTS has at least one or several sensors to detect objects or people who are in the road.

Accordingly, a single driverless transport system is provided for a variety of container-processing apparatus. The driverless transport system can therefore be controlled in such a way that, for example, it first brings new blow molds to the forming device and then fetches the next format parts, for example holding devices, and brings them to the transport device. The driverless transport system can be controlled in such a way that the format parts are first brought to the container-processing apparatus in which the changeover process takes the longest. In addition, the driverless transport system can be controlled such that, for example after the last container of this type has been treated in the shaping device, the new blow molds are already present here and can be replaced, but the labeling or filling, etc. of the containers can continue unimpeded. Accordingly, the production of the new container type can already begin, for example, while the new packaging still has to be delivered to the packaging facility, for example, or the old container type is still being packed here. The driverless transport system can therefore be controlled in such a way that the production of the containers can be continued in a particularly effective manner despite the changeover to a new container type.

In a further embodiment, the at least one container-processing apparatus is assigned to a changing robot for replacing and/or exchanging the format parts and/or tools, wherein the driverless transport system and the changing robot are in communication connection to each other and/or the driverless transport system and the changing robot are contactable via a contact point. It is therefore possible for the driverless transport system to be connected to the robot or to dock with the robot. For this purpose, at least one contact point is arranged on the changing robot and the driverless transport system, and these contact points are corresponding connection points which enable a positive and/or non-positive connection between the robot and the driverless transport system.

Instead of the driverless transport system, it would also be conceivable that the carrying frame can be contacted with the changing robot, and that the carrying frame has corresponding contact points for this purpose, or that the driverless transport system and/or the carrying frame and the container-processing apparatus can be contacted, wherein also here a contact point is arranged accordingly on the container-processing apparatus. In these cases, the contact points are designed such that a positive and/or non-positive connection between the driverless transport system and the container-processing apparatus or a positive and/or non-positive connection between the carrying frame and the changing robot can be established. The carrying frame, the driverless transport system, the changing robot and the container-processing apparatus each have a corresponding contact point, so that the carrying frame, the driverless transport system, the changing robot and the container-processing apparatus can each be contacted. However, the respective contact points are particularly designed such that the carrying frame and the driverless transport system can be contacted with the changing robot and the container-processing apparatus.

The driverless transport system and the changing robot and/or the carrying frame and the changing robot and/or the driverless transport system and the container-processing apparatus and/or the carrying frame and the container-processing apparatus can be connected to one another in such a way that the robot can take over the format parts and/or tools and particularly can change the format parts. Embodiments of the present invention accordingly not only enables an automatic delivery of the format parts to container-processing apparatus, but also enables an automatic change of the format parts. For this purpose, the changing robot has at least one gripping device in order to grip the format parts and/or tools. The robot has at least two and particularly a variety of gripping devices. Accordingly, the robot can, for example, grip the format part to be replaced with a gripping device and then immediately insert the new format part with another or similar gripping device in order to enable particularly fast exchange of the format parts. The DTS itself could also replace the format parts, with at least one robot arm being arranged on the DTS for this purpose.

However, it would also be conceivable that the driverless transport system only places the carrying frame in the working area of the robot and the robot then grips the format parts or the driverless transport system transfers the format parts to the robot or that the format parts are exchanged manually, for example via a manipulator. In addition, the carrying frames could also be designed in such a way that, for example, blow molds can be made available directly for changing with a changing robot in a robot cell. The robot is advantageously arranged in such a way that it can, for example, change the blow mold on the shaping device and can also, for example, change the holding mandrels or clamps on the heating device. Accordingly, the changing robot carries out the exchange of the format parts on at least two container-processing apparatus. The changing robot can be localized via the location registration device of the driverless transport system. However, it is advantageous for each container processing system to have its own changing robot and the DTS supplies all container-processing apparatus with the format parts and/or tools.

In a further embodiment, the carrying frame has at least one sensor and/or at least one fixing edge to position the carrying frame with respect the changing robot. The carrying frame particularly has at least two sensors and/or fixing edges. As a result, the position of the carrying frame relative to the changing robot can be determined and taken into account by the robot itself, for example by approaching the sensors or fixed edges, in the case of inaccurate or non-centered provision. The carrying frame can also be fixed in this way.

In addition, it would also be conceivable for a barcode, RFID chip or the like to be arranged on the carrying frame, so it can be recognized by the driverless transport system. This makes it possible for the driverless transport system to recognize the required carrying frame in the warehouse and bring it to the container-processing apparatus. This barcode or RFID chip can also be used to assign or identify the carrying frame and the container-processing apparatus. The driverless transport system can also identify the location of the corresponding carrying frame via the location registration device.

In a further embodiment, the control system of the driverless transport system is coupled with a control system of the container-processing apparatus. As a result, the container-processing apparatus can be operated independently, i.e. without operator intervention, and send a signal to the driverless transport system when new format parts and/or tools are required. The driverless transport system is accordingly informed when a change has to be made or in which production stage the container-processing apparatus is currently located and which container type is to be produced next, so that the driverless transport system provides the required format parts and/or can provide tools.

Accordingly, the time of the change and the travel path of the transport system can be controlled via the control device of the driverless transport system. The control device of the driverless transport system can advantageously be controlled by a system operator and/or by the container-processing apparatus itself.

Embodiments of the present invention is also directed to a method for treating containers and in particular plastic containers with at least one container-processing device, which has at least one changeover access entry, at which format parts and/or tools will be exchanged during changeover operation, and comprising a transport system, by means of which the format parts and/or tools will be brought to the at least one container-processing apparatus.

According to embodiments of the invention, the transport system is a driverless transport system, by means of which the format parts and/or tools will be automatically brought to at least one container-processing apparatus.

It is therefore also proposed concerning the method that when the container-processing apparatus is converted to a new container type, the format parts required for this are provided by means of an autonomously movable transport system, so that a particularly effective changeover with little downtime of the system is possible without additional personnel.

In a method, a changing robot arranged at at least one container-processing apparatus removes the format parts and/or tools arranged on a carrying frame from the carrying frame and carries out the replacement or exchange of the format parts and/or tools. Accordingly, it is further proposed that not only the format parts are made available automatically, but essentially the entire changing process is carried out automatically.

BRIEF DESCRIPTION

Figure 2:
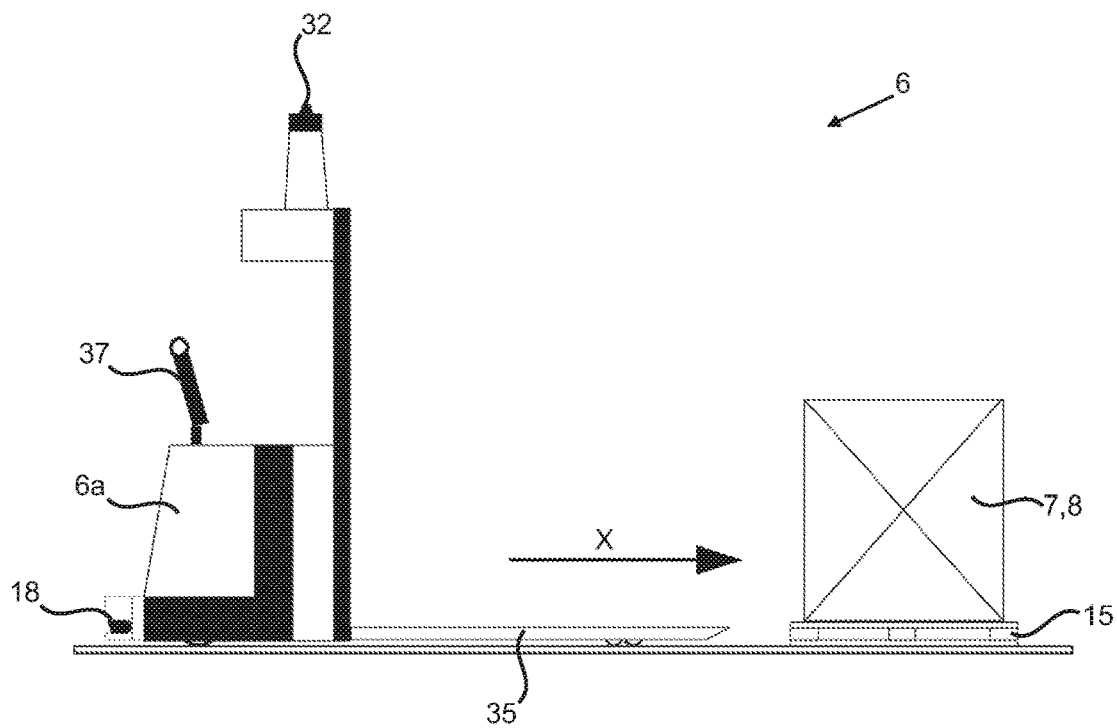
Figure 3:
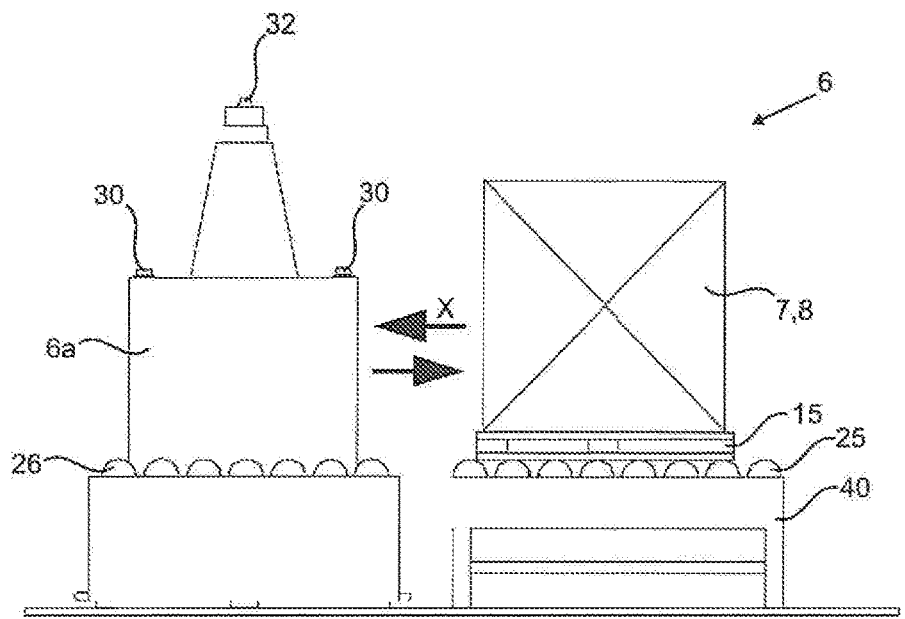

Some of the embodiments will be described in detail, with reference to the following figures, wherein like designations denote like members, wherein:

FIG. 1 a schematic depiction of a device for processing containers according to embodiments of the invention;

FIG. 2 a schematic depiction of a first embodiment of a driverless transport system;

FIG. 3 a schematic depiction of a second embodiment of a driverless transport system;

and

Figure 4:
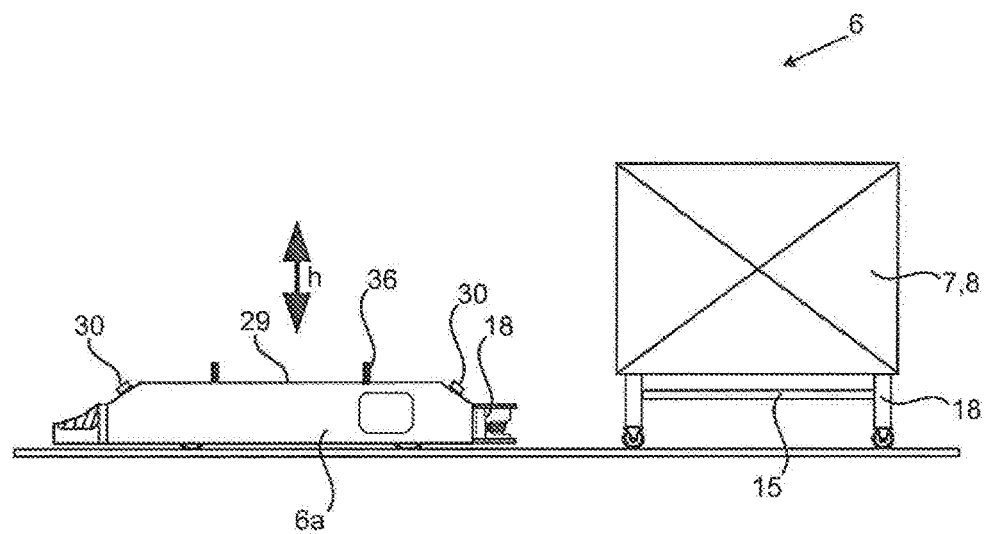

FIG. 4 a schematic depiction of another embodiment of a driverless transport system.

DETAILED DESCRIPTION

FIG. 1 shows a schematic depiction of a device 1 for processing containers 10 with a driverless transport system 6a according to embodiments of the invention. The device 1 has a container-processing apparatus 2, whereby in this embodiment the driverless transport system 6a can contact the container-processing apparatus 2 via a contact point 18. This contact point 18 is located next to a working position 12, where the changing process takes place. Accordingly, the driverless transport system 6a, as shown in FIGS. 2 and 4, also has a corresponding contact point 18. The reference sign 5 indicates a changeover access entry 5 of the container-processing apparatus 2.

The driverless transport system 6a has a carrying frame 15 in this depiction, which is indicated by the dotted lines. Format parts 7 and tools 8 are arranged on the carrying frame 15 for the changeover of the container-processing apparatus 2. The container-processing apparatus 2 has a control system 23, which is coupled with a control system 22 of the carrying frame 15.

The reference sign 17 indicates a changing robot which can grip the format parts 7 and tools 8 for the changeover of the container-processing apparatus 2. The second changing robot 17, shown as a dashed line, illustrates that it could also be for the changing robot to be arranged within the container-processing apparatus 2.

FIG. 2 shows a schematic depiction of a first embodiment of a driverless transport system 6a. The driverless transport system 6a is designed as a lifting wagon with forks 35 in this embodiment, which are moved in a direction of movement x under the carrying frame 15 to pick it up. The format parts 7 and tools 8 are arranged schematically on the carrying frame 15. The reference sign 18 indicates the contact point via which the driverless transport system 6a can be contacted with the container-processing apparatus 2. However, it could also be that this contact point 18 is arranged on the carrying frame 15 and that the carrying frame can be contacted with the container-processing apparatus 2. The driverless transport system also has a location registration device 32, by means of which the driverless transport system 6a can locate the container-processing apparatus 2 and also the carrying frame 15. The reference sign 37 indicates a handle by which the driverless transport system 6a can also be moved manually if necessary.

FIG. 3 shows a schematic depiction of a second embodiment of a driverless transport system 6a. It can be seen that there is a further frame 40 underneath the carrying frame 15 which has load-bearing rollers 25 over which the carrying frame 15 can be pushed onto the driverless transport system 6a in the direction of movement x. Load-bearing rollers 26 are also arranged on the driverless transport system 6a itself. The reference sign 32 indicates the location registration device. Furthermore, the driverless transport system 6a has sensors 30 in this embodiment, so that the driverless transport system 6a can detect persons or objects in the roadway.

FIG. 4 shows a schematic depiction of another embodiment of a driverless transport system 6a. The driverless transport system 6a is driven under the carrying frame 15 in this embodiment and can be moved in the lifting direction h by means of a lifting device 29 to accommodate the carrying frame 15. The carrying frame 15 itself also has such a lifting device 28, so that the carrying frame 15 can also be moved in the lifting direction h. The reference sign 36 indicates capturing elements for receiving and holding the carrying frame 15.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCES 1 device
2 container-processing apparatus
5 changeover access entry
6 transport system
6a driverless transport system
7 format parts
8 tools
10 containers
12 working position
15 carrying frame
17 changing robot
18 contact point
22 control system of the driverless transport system 6a
23 control system of the container-processing apparatus 2
25 load-bearing rollers of the carrying structure 15
26 load-bearing rollers of the driverless transport system 6a
28 lifting device of the carrying structure 15
29 lifting device of the driverless transport system 6a
30 sensors
32 location registration device
35 fork
36 capturing elements
37 handle
40 frame
h lifting movement
x direction of movement

The invention claimed is:

1. A device for processing containers, comprising at least one container-processing apparatus, which has at least one changeover access entry, at which format parts and tools can be exchanged during changeover operation, and comprising a transport system, of which the format parts and/or tools can be brought to the at least one container-processing apparatus, wherein the transport system is a driverless transport system, by which the format parts and/or tools can be automatically brought to at least one container-processing apparatus, and wherein at least one container-processing apparatus is assigned to a changing robot for at least one of replacing and exchanging the format parts and/or tools, wherein the driverless transport system and the changing robot are in communication connection to each other and the driverless transport system and the changing robot are contactable via corresponding contact points, so that the driverless transport system can be connected to the changing robot, wherein at least one first contact point is arranged on the changing robot and at least one second contact point is arranged on the driverless transport system and the at least one first contact point and the at least one second contact point are corresponding connection points which enable a positive and/or non-positive connection between the changing robot and the driverless transport system.

2. The device according to claim 1, wherein the container-processing apparatus is selected from a group of processing apparatus, which includes a heating device for heating the containers, a shaping device for shaping the containers, a labelling device for the labelling of the containers, a filling device for filling the containers, a closing device for closing the containers, a packaging device for packing the containers, a transport device for transporting the containers, a sterilization device for sterilising the containers or the like.

3. The device according to claim 1, wherein the format parts and/or tools are transferable by the driverless transport system to a predetermined working position of the container-processing apparatus, wherein this working position is the changeover access entry.

4. The device according to claim 1, wherein format parts and/or tools are arranged on a carrying frame which can be received and/or taken off by the driverless transport system.

5. The device according to claim 4, wherein the carrying frame has at least one sensor and at least one fixing edge to position the carrying frame with respect to the changing robot.

6. The device according to claim 1, wherein the device has a variety of container-processing apparatus and by the driverless transport system the format parts and/or tools are bringable to the variety of container-processing apparatus.

7. The device according to claim 6, wherein the driverless transport system is freely movable between a variety of container-processing apparatus or can be movable on a rail system.

8. The device according to claim 7, wherein the rail system runs between individual container-processing apparatuses, and the path of the transport system can be predetermined via a control device.

9. The device according to claim 1, wherein a control system of the driverless transport system is coupled with a control system of the container-processing apparatus.

10. The device according to claim 1, wherein the device has a variety of container-processing apparatuses, wherein each container processing apparatus has its own changing robot and the driverless transport system supplies all container-processing apparatus with the format parts and/or tools.

11. The device according to claim 1, wherein the format parts and/or tools are already at the container-processing apparatus before the changeover begins.

12. The device according to claim 1, wherein a changeover can already be started during operation.

13. The device according to claim 1, wherein the driverless transport system has a location registration device in order to locate the working position or the changeover access entry.

14. The device according to claim 1, wherein the driverless transport system itself could also replace the format parts, wherein therefore at least one robot arm is arranged on the driverless transport system.

15. A method for processing containers, comprising at least one container-processing apparatus, which has at least one changeover access entry, at which format parts and/or tools will be exchanged during changeover operation, and comprising a transport system, by which the format parts and/or tools will be brought to the at least one container-processing apparatus, wherein the transport system is a driverless transport system, by which the format parts and/or tools will be automatically brought to at least one container-processing apparatus, and wherein at least one container-processing apparatus is assigned to a changing robot for at least one of replacing and exchanging the format parts and/or tools, wherein the driverless transport system and the changing robot are in communication connection to each other and the driverless transport system and the changing robot are contactable via corresponding contact points, so that the driverless transport system can be connected to the changing robot, wherein at least one first contact point is arranged on the changing robot and at least one second contact point is arranged on the driverless transport system and the at least one first contact point and the at least one second contact point are corresponding connection points which enable a positive and/or non-positive connection between the changing robot and the driverless transport system.

16. A method according to claim 15, wherein the changing robot arranged at at least one container-processing apparatus removes the format parts and/or tools arranged on a carrying frame from the carrying frame and carries out the replacement or exchange of the format parts and/or tools.

17. The method of claim 15 for processing containers, wherein the processing containers are plastic containers.

* * * * *